3,491,050
POLYURETHANE DISPERSIONS
Wolfgang Keberle, Bergisch-Neukirchen, and Artur Reischl and Dieter Dieterich, Leverkusen, Germany, assignors to Farbenfabriken Bayer Aktiengesellschaft, Leverkusen, Germany, a corporation of Germany
No Drawing. Filed Aug. 31, 1966, Ser. No. 576,210
Claims priority, application Germany, Sept. 3, 1965, F 47,084
Int. Cl. C08g 51/22, 41/00
U.S. Cl. 260—29.2     6 Claims

ABSTRACT OF THE DISCLOSURE

A method for preparing dispersions of cross-linked polyurethanes by dispersing in water a salt-type polyurethane prepared by reacting in an organic solvent a microgel of a polyurethane having free isocyanate groups with a compound having one hydrogen atom reactive with isocyanate groups and containing at least one salt-type group or group capable of salt formation which is subsequently converted into the salt form before the polyurethane is dispersed in water.

---

This invention relates to the preparation of polyurethane dispersions and, more particularly, to the preparation of dispersions of crosslinked polyurethanes in water.

The preparation of polyurethanes which are soluble or dispersible in water is already known. These polyurethanes may be linear or branched and are distinguished by containing an appreciable amount of salt-type groups which impart to them their characteristics of solubility or dispersability in water. A primary condition for achieving the solubility or dispersability of polyurethanes in water is that the intermediate addition product produced in the course of the formation of the macromolecule, and the macromolecules formed in the last stage after the polyaddition process before conversion into the aqueous phase, should not be cross-linked since cross-linked polyurethanes have not been dispersible or soluble in water heretofore.

It is therefore an object of this invention to provide a method for the dispersion of cross-linked polyurethanes in an aqueous phase which is devoid of the foregoing disadvantages.

Another object of this invention is to provide improved methods for the preparation of polyurethane plastics.

A further object of this invention is to provide aqueous dispersions of high molecular weight cross-linked polyurethanes which are stable without the addition of an emulsifier.

It is still another object of this invention to provide dispersions of cross-linked high molecular weight polyurethanes which are suitable for use in the fabrication of dip-molded articles, coagulates, adhesives, films, foils and crystalline powders, coating and impregnating textiles and the like, crease-resistant dressings, binders, backing agents, plasticizers and binders, as well as in the coating and impregnating of textiles and the like, in the cloth printing and paper industry, in dressing leather, as sizing agents, as additives to polymer dispersions, as expedients for imparting hydrophobic characteristics to a material and so on.

The foregoing objects and others which will become apparent from the following description are accomplished in accordance with this invention, generally speaking, by dispersing in water a salt-type polyurethane prepared by reacting in an organic solvent a microgel of a polyurethane mass having free isocyanate groups with a compound having at least one hydrogen atom reactive with isocyanate groups and containing at least one salt-type group or a group capable of salt formation which is subsequently converted at least partially into the salt form. After introducing the cross-linked salt-type polyurethane into the aqueous phase, both anionic and cationic pure aqueous polyurethane dispersions free from emulsifier may be obtained. The microgel introduced into the aqueous phase is prepared in a known manner by the isocyanate polyaddition process whereby compounds having hydrogen atoms reactive with isocyanate groups as determined by the Zerewitinoff method and a molecular weight of from about 300 to about 20,000 and, if desired, chain lengthening agents having several hydrogen atoms reactive with an isocyanate group are reacted with an excess of an organic polyisocyanate to form cross-linked polyurethane masses having free isocyanate groups. The urethane containing free isocyanate groups when present in the form of a microgel is reacted in an organic solvent with a compound containing at least one reactive hydrogen atom and at least one salt-type group or a group capable of salt formation. In the latter instance, the group capable of salt formation is subsequently converted by any of the known processes at least partially into the salt form before the polyurethane is dispersed in water. Thus, it is possible to obtain an aqueous dispersion of a cross-linked, high molecular weight polymer although it had been wellknown heretofore that such cross-linked polyurethane masses are insoluble in organic solvents and therefore also in water.

The term microgel as used throughout this specification denotes materials with a particle size resulting in opalescent solutions which are liquid up to a concentration of 30% by weight, higher concentrations are jelly-like. The microgels comprise cross-linked molecules. Microgels dry to give elastic films which are insoluble in acetone. They do not exhibit flowing properties according to Newton and show abnormal viscosity relative to concentration.

Any suitable organic compound containing at least two hydrogen atoms which are reactive with isocyanate groups may be used in the preparation of the polyurethane microgel of this invention. Preferably, however, the active hydrogen containing compounds should be substantially linear and have a molecular weight of from about 300 to about 20,000, but preferably from about 500 to about 4000, and contain terminal hydroxyl, carboxyl, amino or mercapto groups. Preferably, however, polyhydroxy compounds such as, for example, polyesters, polyacetals, polyethers, polythioethers, polyamides and polyester amides should be used.

Any suitable polyhydric polyalkylene ether may be used such as, for example, the condensation product of polyhydric alcohols or mixtures thereof and the condensation product of an alkylene oxide beginning with any suitable initiator. The initiator may be a difunctional compound, including water, so that the resulting polyether is essentially a chain of repeating alkylene oxy groups as in polyethylene ether glycol, polypropylene ether glycol, polybutylene ether glycol and the like; or the initiator may be any suitable active hydrogen containing compound which may be a monomer or even a compound having a relatively high molecular weight including other active hydrogen containing compounds as disclosed herein. It is preferred that the initiator, including as such amines, alcohols, amino alcohols and the like, have from 2 to 8 active sites to which the alkylene oxides may add. Any suitable alkylene oxide may be used such as, for example, ethylene oxide, propylene oxide, butylene oxide, amylene oxide, tetrahydrofuran, epihalohydrins such as epichlorohydrin, styrene oxide and the like as well as their copolymerization or graft polymerization products. Any suitable initiator may be used including, for example, water, polyhydric alcohols, preferably having 2 to 8 hydroxyl groups, amines, preferably having 2 to 8 replaceable hydrogen atoms bonded to nitrogen atoms, amino alcohols and the like. The resulting polyhydric polyalkylene ethers may have either primary or secondary hydroxyl groups or mixtures of primary and secondary hydroxyl groups. It is preferred to use alkylene oxides which contain from 2 to 5 carbon atoms and, generally speaking, it is advantageous to condense from about 5 to about 30 mols of alkylene oxide per functional group of the initiator. There are many suitable processes for the preparation of polyhydric polyalkylene ethers including U.S. Patents 1,922,459, 3,009,939 and 3,061,625 or by the process disclosed by Wurtz in 1859 and discussed in the Encyclopedia of Chemical Technology, volume 7, pages 257 to 262, published by Interscience Publishers, Inc. (1951).

Specific examples of initiators are water, ethylene glycol, propylene glycol, glycerine, trimethylol propane, pentaerythritol, arabitol, sorbitol, maltose, sucrose, ammonia, diethanolamine, triethanolamine, dipropanolamine, tripropanolamine, diethanolpropanolamine, tributanolamine, 2,4 - tolylene diamine, 4,4' - diphenylmethane diamine, p,p',p'' - triphenylmethane triamine, ethylene diamine, propylene diamine, propylene triamine, N,N,N',N', - tetrakis- (2 - hydroxypropyl) ethylene diamine, diethylene triamine and the like.

Any suitable polyhydric polythioether may be used such as, for example, the condensation product of thiodiglycol or the reaction product of a polyhydric alcohol, such as is disclosed herein for the preparation of the hydroxyl polyesters, with thiodiglycol or any other suitable thioethergly-col. Other suitable polyhydric polythioethers are disclosed in U.S. Patents 2,862,972 and 2,900,368.

Any suitable polyacetal may be used such as, for example, the reaction product of formaldehyde or any other suitable aldehyde with a polyhydric alcohol such as those disclosed herein for the preparation of the hydroxyl polyesters.

The polyesters, polyester amides and polyamides include the predominantly linear condensates obtained from polybasic saturated and unsaturated carboxylic acids and polyvalent saturated and unsaturated alcohols, aminoalcohols, diamines, polyamines and their mixtures such as, for example, polyterephthalates or polycarbonates.

Any suitable hydroxyl polyester, including lactone polyesters may be used, such as, for example, the reaction product of a polycarboxylic acid and polyhydric alcohol. Any suitable polycarboxylic acid may be used such as, for example, oxalic acid, malonic acid, succinic acid, glutaric acid, adipic acid, pimelic acid, suberic acid, azelaic acid, sebacic acid, brassylic acid, thapsic acid, maleic acid, fumaric acid, glutaonic acid, alpha - hydromuconic acid, beta - hydromuconic acid, alpha - butyl - alpha - ethylglutaric acid, alpha, beta - diethylsuccinic acid, isophthalic acid, terephthalic acid, hemimellitic acid, trimellitic acid, trimesic acid, mellophanic acid, prehnitic acid, pyromellitic acid, benzenepentacarboxylic acid, 1,4 - cyclohexanedicarboxylic acid, 3,4,9,10 - perylenetetracarboxylic acid and the like. Any suitable polyhydric alcohol may be used such as, for example, ethylene glycol, 1,3-propylene glycol, 1,2 - butylene glycol, 1,2 - propylene glycol, 1,4 - butylene glycol, 1,3 - butylene glycol, 1,5 - pentane diol, 1,4 - pentane diol, 1,3 - pentane diol, 1,6 - hexane diol, 1,7 - heptane diol, glycerine, trimethylolpropane, 1,3,6-hexanetriol, triethanolamine, pentaerythritol, sorbitol and the like.

The hydroxyl polyester may also be a polyester amide such as is obtained, for example, by including some amine or amino alcohol in the reactants for the preparation of the polyesters. Thus, polyester amides may be obtained by condensing an amino alcohol such as ethanolamine with the polycarboxylic acids set forth herein or they may be made using the same components that make up the hydroxyl polyester with only a portion of the components being a diamine such as ethylene diamine and the like.

Any suitable polyamine may be used including, for example, aromatic polyamines such as p-amino aniline, 1,5- diamino naphthalene, 2,4 - diamino toluene, 1,3,5 - benzene triamine, 1,2,3 - benzene triamine, 1,4,5,8 - naphthalene tetramine and the like; aliphatic polyamines such as, for example, ethylene diamine, 1,3 - propylene diamine, 1,4 - butylene diamine, 1,3 - butylene diamine, diethylene triamine, triethylene tetramine, 1,3,6 - hexane triamine, 1,3,5,7 - heptane tetramine and the like; heterocyclic polyamines such as, for example, 2,6 - diamino pyridine, 2,4-diamino - 5 - aminomethyl pyrimidine, 2,5 - diamino-1,3,4-thiadiazole and the like.

Polyhydroxy compounds already containing urethane or urea groups as well as natural polyols such as castor oil and carbohydrates may also be used.

Mixtures of different polyhydroxy compounds may be used for varying the lyophilic or hydrophobic properties and mechanical properties of the products of the process.

Any suitable organic polyisocyanate may be used in the preparation of the dispersed polyurethane of this invention including aromatic and aliphatic diisocyanates such as, for example, 1,5 - naphthylene diisocyanate, 4,4' - diphenylmethane diisocyanate, 4,4' - diphenyldimethylmethane diisocyanate, di- and tetra-alkyldiphenylmethane diisocyanate such as, for example, 2,2' - dimethyldiphenylmethane diisocyanate, 2,2',5,5' - tetrapropyl diphenylmethane diisocyanate and the like, 4,4' - dibenzyldiisocyanate, 1,3 - phenylenediisocyanate, 1,4 - phenylenediisocyanate, 2,4 - tolylene diisocyanate, 2,6 - tolylene diisocyanate and isomeric mixtures thereof, chlorinated and brominated diisocyanates such as, for example, 1-chlorobenzyl-2,5 - diisocyanate, 1 - bromobenzyl - 2,4 - diisocyanate, 1,3 - dibromobenzyl - 2,4 - diisocyanate, 3,3' - dichlorodiphenyldimethylmethane - 4,4' - diisocyanate, phosphorus-containing diisocyanates such as, for example, those disclosed in U.S. Patent 3,246,033 and the like; butane-1,4-diisocyanate, hexane - 1,6 - diisocyanate, dodecamethylene diisocyanate, dicyclohexylmethane diisocyanate, cyclohexane - 1,4 - diisocyanate and the like. Higher-functional isocyanates are triphenylmethane - 4,4',4'' - triisocyanate, the reaction product of three mols of toluylene diisocyanate to one mole of trimethylolpropane or glycerol, the reaction product of four mols of toluylene diisocyanate to pentaerythritol, the trimer or tetramer of 2,4-toluylene diisocyanate.

Of particular interest are the partially masked polyisocyanates which enable self-cross-linking polyurethanes to be formed such as, for example, dimeric tolylene diisocyanate or polyisocyanates which have been partially reacted, for example wtih phenol, tertiary butanol, phthalimide or caprolactam. However, in the practice of the invention, the 4,4'-diphenylmethane diisocyanate and the isomeric tolylene diisocyanates as well as hexane-1,6-diisocyanate are preferred.

Any suitable chain-lengthening agent which contains reactive hydrogen atoms may be used in the practice of this invention including water, saturated glycols such as, for example, ethylene glycol or condensates of ethylene glycol, butane diol, propane-1,2-diol, propane-1,3-diol, trimethylolpropane, glycerol, pentaerythritol, sorbitol, neopentyl glycol, hexanediol, bis-hydroxymethyl-cyclohexane, dihydroxyethyldian, mono- and bis-alkoxylated aliphatic cycloaliphatic, aromatic and heterocyclic primary amines such as, for example, N-methyldiethanolamine, N-butyldiethanolamine, N,N-bis-g-aminopropyl-N-methylamine, N-oleyldiethanolamine, N-cyclohexyl-diisopropanolamine, N,N-dihydroxyethyl-p-toluidine, N, N - dihydroxypropylnaphthylamine, polyethoxylated N-butyldiethanolamine, polypropoxylated - N - methyldiethanolamine (molecular weight about 300 to about 4000), polyesters with tertiary amino groups, dimethyl-bis-hydroxyethyl-hydrazine and the like. Unsaturated glycols may also be used such as, for example, butanediol or glycerol monoalkyl ether and the like as disclosed hereinbefore.

Any suitable aliphatic, cycloaliphatic and aromatic diamine may be used as the chain extender including, for example, ethylene diamine, hexamethylenediamine, 1,4-cyclohexylene diamine, 1,3-propylene diamine, 1,4-butylene diamine, benzidine, diaminodiphenylmethane, the isomers of phenylenediamine, p-amino aniline, 1,5-diamino naphthalene, 2,4-diamino toluene, hydrazine, ammonia, carbohydrazide and the like.

Any suitable amino alcohols may be used as the chain extender including, for example, ethanolamine, propanolamine, butanolamine, dipropanolamine, tripropanolamine, diethanolpropanolamine, tributanolamine and the like.

Any suitable compound having at least one group which is reactive with isocyanate groups and at least one salt-type group or group capable of salt formation and mixtures of such compounds may be used in the practice of this invention including compounds containing carboxylic acid groups or sulphonic acid groups capable of salt formation such as, for example, hydroxy and mercapto acids including glycollic acid, thioglycollic acid, lactic acid, trichlorolactic acid, malic acid, salicylic acid, 4-hydroxyisophthalic acid, hydroxyterephthalic acid, b-hydroxypropionic acid, m-hydroxy-benzoic acid, tartaric acid, citric acid and the like; aliphatic, cycloaliphatic aromatic and heterocyclic aminocarboxylic acids including glycine, a- and b-alanine, 6-aminocaproic acid, 4-aminobutyric acid, the isomeric aminobenzoic acids, aminonaphthoic acids and the like; hydroxysulphonic acids such as 2-hydroxyethane sulphonic acids, 3-hydroxypropanesulphonic acid, 4-hydroxybutanesulphonic acid, phenol-2,4-disulphonic acid and the like; aminosulphonic acids such as sulphanilic acid, N-phenyl-aminomethanesulfonic acid, taurine, methyltaurine, butyltaurine, 3-aminotoluene-N-methane sulphonic acid and the like; the addition products of unsaturated acids such as, for example, acrylic acid, methacrylic acid, vinylsulphonic acid, styrene sulphonic acid and the like with unsaturated nitriles such as, for example, acrylonitrile and the like; the addition products of an acid and an amine, including acids which may be saponified such as, for example, the above-mentioned acids; cyclic dicarboxylic anhydrides such as, for example, maleic anhydride, phthalic anhydride, succinic anhydride and the like; sulphocarboxylic acid anhydrides such as sulphoacetic acid anhydride, o-sulphobenzoic acid anhydride and the like; lactones such as, for example, b-propiolactone and the like; reaction products of olefines with sulphur trioxide such as, for example, carbyl sulphate and the like; epoxycarboxylic and epoxysulfonic acids such as, for example, glycidic acid, 2,3-epoxypropane sulphonic acid and the like; sultones such as, for example, 1,3-propanesultone, 1,4-butanesultone, 1,8-naphthasultone and the like; cyclic sulphates such as, for example, glycol sulphate and the like; disulfonic acid anhydrides such as, for example, benzene disulphonic acid-(1,2)-anhydride and the like. Some suitable amines for the preparation of the addition product are aliphatic and aromatic amines such as methylamine, ethylamine, propylamine, butylamine, oleylamine, stearylamine, aniline, toluidine, 1,2-ethylenediamine, 1,6-hexamethylenediamine, all of the isomeric phenylene diamines, hydrazine and alkylated hydrazines such as, for example, butyl hydrazine, ammonia, amino alcohols such as hydroxylalkylated amines and hydrazines including, for example, ethanolamine hydroxypentylhydrazine and the like; the addition products of sodium hydrogen sulphite and olefinically unsaturated alcohols and amines, such as, for example, allyl alcohol and allylamine. Any suitable compound having quaternatable or ternatable groups which can be neutralized with acids may also be used including, for example, alcohols and, in particular, alkoxylated aliphatic, cycloaliphatic, aromatic and heterocyclic secondary amines such as, for example, N,N-dimethylethanolamine, N,N - diethylethanolamine, N,N - dibutylethanolamine, 1-dimethylaminopropanol-2, N,N-methyl-b-hydroxypropylaniline, N,N-ethyl-b-hydroxyethylaniline, N, N - butyl-b-hydroxyethylaniline, N - hydroxyethylpiperidine, N - hydroxyethylmorpholine, a - hydroxyethylpyridine, b-hydroxyethylquinoline and the like; phosphines such as, for example, diethyl-b-hydroxyethylphosphine and the like; sulphides such as, for example, b-hydroxyethylmethyl thioether and the like; amines such as, for example, N,N-dimethylhydrazine, N,N-dimethyl-ethylenediamine, N,N-dimethylpropylene diamine, 1-diethylamine - 4 - aminopentane, a-aminopyridine, 3-amino-N-ethylcarbazole, N-aminopropyl piperidine, N-aminopropylmorpholine, N-aminoethylpiperidine and the like. Compounds with two hydroxyl groups are N-methyl diethanolamine, N-butyl ethanol amine, bis-oxethyl piperazine. Compounds with two amino groups are γ,γ-bisamino propyl methylamine, N-methyl triethylene tetramine and dipropylene triamine.

Compounds which contain halogen atoms capable of quaternating reactions or corresponding ester groups of strong acids may also be used including, for example, alcohols and amines such as 2-chloroethanol, 2-bromoethanol, 4-chlorobutanol, 3-bromopropanol, b-chloroethylamine, 6-chlorohexylamine, the sulphuric acid ester of ethanolamine, N-hydroxyethyl-N′-chlorohexyl urea, chloroacetyl ethylene diamine, 1,3-dichloropropanol-2, trichloroacetyl triethylene tetramine and the like.

Any suitable compound containing at least one group capable of salt formation may also be used. Some such suitable compounds are, for example, organic bases including monofunctional primary, secondary and tertiary amines such as, for example, methylamine, diethylamine, triethylamine, trimethylamine, dimethylamine, ethylamine, tributylamine, pryadine, aniline, toluylene, alkoxylated amines such as, for example, ethanolamine, diethanolamine, triethanolamine, methyldiethanolamine, oleyldiethanolamine, polyfunctional polyamines in which the individual amino groups may have different basicities such as, for example, polyamines obtained by the hydrogenation of the addition products of acrylonitrile with primary and secondary amines, per- or partially alkylated polyamines such as, for example, N,N-dimethylethylene diamine and the like; inorganic bases including compounds which are basic in reaction or split off bases such as, for example, ammonia, monovalent metal hydroxides, carbonates and oxides such as sodium hydroxide, potassium hydroxide, calcium oxide, sodium bicarbonate, potassium carbonate and the like; sulphides and phosphines such as, for example, dimethylsulphide, diethylsulphide, thiodiglycol, trialkylphosphines such as trimethyl phosphine, alkylarylphosphines such as dimethyl tolyl phosphine, triarylphosphines such as triphenylphosphine and the like; inorganic and organic acids, compounds with reactive halogen atoms and the corresponding esters of strong acids such as, for example, hydrochloric acid, nitric acid, hydrofluoric acid, hypophosphorous acid, amido sulphonic acid, hydroxylamine sulphonic acid, formic acid, acetic acid, sulphuric acid, glycollic acid, lactic acid, chloroacetic acid, sorbitoboric acid, methyl chloride, butyl bromide, dimethylsulphate, diethylsulphate, benzyl chloride, the methyl ester of p-toluene sulphonic acid, methyl bromide, ethylene chlorohydrin, glycerol-a-bromohydrin, ethyl chloroacetate, ethylbromoacetate, chloroacetamide, bromoacetamide, chlorobromoethane, dichlorodurol, methyl chloromethyl ether, ethyl chloromethyl ether and the like.

The polyurethane masses which still contain free isocyanate groups and which, for the process of the invention, must be present in microgel form in an organic solvent, should have as high molecular weight as possible. In order to achieve a microgel structure it is essential that these masses must be at least to some extent cross-linked. This may be achieved, for example, by using a greater excess of isocyanate groups in the preparation of the polyurethane mass than corresponds to the amount of free isocyanate groups remaining in the mass. In order to accomplish this, a very large excess of isocyanate up to about 100% over the hydrogen atoms entering into reaction should be used. Prolonged or intensive heating of the reaction product will exert a cross-linking effect by causing the formation of allophanate, biuret, uretdione and isocyanurate structures, for example, from the additional excess isocyanate groups, although care must be taken to insure that a residual content of from about 0.1 to about 5% by weight of free isocyanate groups remains. By applying more vigorous reaction conditions, that is, by increasing the reaction temperature or using catalysts, cross-linking side reactions can be effected with smaller quantities of excess polyisocyanate. Further, the degree of cross-linking can be enhanced by the addition of tri- or tetra-functional reaction components.

The preparation of the cross-linked polyurethane masses which contain free isocyanate groups is preferably carried out in the melt phase in a one step or multi-step process at temperatures of up to about 200° C. The polyaddition reaction or the individual stages of it may occasionally be carried out in solution, if desired with the use of catalysts, in which case a high boiling solvent such as, for example, dimethylformamide, dimethyl sulphoxide and the like may be used.

The cross-linked polyurethane masses containing free isocyanate groups and present in the form of microgel are suitably dissolved in an organic solvent at about 20° to about 150° C. and then reacted, advantageously at about 0° to about 120° C. with a compound containing at least one group reactive with isocyanate groups and at least one salt-type group or group capable of salt formation. The latter reactant may be in solution in an organic solvent or in water, and where compounds are used which do not contain salt groups but have at least one group capable of salt formation, at least a partial conversion into the salt form is effected, for example, by adding organic or inorganic bases or acids, neutralizing agents or quaternizing agents to the said compounds in an organic or inorganic solvent. If desired, these salt-forming additives need no solvent therefor. The salt-forming reaction is carried out at a temperature of between about 0° and 150° C. The quantity of the quaternizing or neutralizing compound to be used depends on the quantity of salt-forming groups present in the polyurethane mass and an excess is indicated only in the case of volatile compounds which evolve easily. In some cases, it is advantageous to use less than equivalent amount of neutralizing or quaternizing agent in order to obtain a certain degree of hydrophobic properties in the polymer and to adjust the pH to a certain value although bi- and polyfunctional neutralizing and quaternating agents such as polyamines or polyhalogen compounds are suitably employed in excess in order to suppress a bilateral reaction which would lead to an increase in particle size.

Compounds in which the individual groups differ in their basicity, acidity or reactivity may also be used as neutralizing or quaternizing agents. Further, the salt may be formed in situ by adding the organic or inorganic bases, neutralizing or quaternizing compound, hereinafter referred to as salt-forming counter components together with the salt-forming component.

The cross-linked polyurethane masses present in the form of microgel used in the process of the invention should preferably have a free isocyanate content of about 0.1 to about 5% by weight. The molar ratio of free isocyanate groups in the polyurethane mass to the reactive groups of the compound or compounds which have at least one salt-type group or a group capable of salt-formation is suitably between about 3:1 and about 1:1.

To achieve satisfactory dispersability of the products of the process, the amount of salt-type groups present should be at least about 0.05% by weight and not more than about 3.0% by weight of the polyurethane mass.

The term "salt-type group" denotes, for example, the following groups:

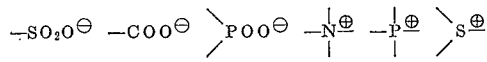

It is astonishing that even very small proportions by weight of salt-type groups in the polyurethane mass are sufficient to yield stable aqueous dispersions of spherical particles, although it is believed that the spheroid shape of the dispersed particles are possible because of the geometrically spherical form of the microgel particles.

The conversion of the polyurethane mass into the aqueous phase may, for example, be effected by a complete or partial replacement of the organic solvent after the termination of the reaction and if suitable after the termination of the salt formation. It is also possible to inject the dissolved or molten, solvent-free polyurethane mass into water through nozzles, if desired under pressure. Ultrasonics may also be used to achieve a suitable state of distribution of polyurethane particles in the aqueous phase.

Polyurethane masses which have groups capable of salt formation which still have to be at least partly converted into the salt form before reaction with the polyurethane mass may be introduced into the aqueous solution of the salt-forming counter component, for example with vigorous stirring. The organic solvent may be removed at the same time or afterwards, if desired in vacuo.

If the compound having hydrogen atoms reactive with isocyanate groups and at least one salt-type group or a group capable of salt formation reacts more rapidly with isocyanates than with water, it may also be added in the form of an aqueous solution to the polyurethane mass which contains isocyanate groups, in which case the salt-type polyurethane mass will already be formed in the aqueous organic phase. Here again, the organic solvent may subsequently be removed by evaporation.

In choosing a solvent, it is necessary to take care that no solvent is used which reacts with isocyanate groups under the reaction conditions. Thus, any solvent that does not enter into reaction with the polyurethane mass and the organic and inorganic bases may be used including, for example, hydrocarbons, which may, if desired, be halogenated, ketones, alcohols, esters, nitriles and ethers such as acetone, methyl ethyl ketone, isopropanol, tertiary butanol, acetonitrile, ethanol, methanol, ethyl acetate, methylene chloride, chloroform, carbon tetrachloride, tetrahydrofuran, 1,2-dichloropropane and the like. The solvents may contain some proportion of water which may even be present in predominant amounts since water, even without addition of organic solvents, may be used as a solvent for the organic and inorganic bases acting as salt-forming counter-components.

The organic solvent may also contain water provided that the water does not impair the reaction between the isocyanate groups present in the polyurethane mass and the reaction components containing reactive hydrogen atoms, which reaction components are present or added at the same time.

It is also possible to carry out the reaction in a polar or nonpolar organic solvent, to add water after reaction has taken place and to remove the organic solvent by evaporation. Further, the polyurethane may first be prepared in solid form and any subsequent reaction such as, for example, the reaction with the chain lengthening agent or the component with salt-forming groups may be thereafter carried out in an organic solvent. In the latter case, it is quite possible to place the organic solvent into the reaction vessel and introduce the water in the form of an aqueous solution of one or another of the reaction components, especially if that reaction component is the one which contains salt-type groups or groups capable of salt formation. Even further, it is possible to place an aqueous solution of the component which has the salt-type groups or groups capable of salt formation into the reaction vessel and add the organic solution of the polyurethane mass. One may also add the water in the form of an aqueous solution of the salt-forming counter-component only after termination of the polyurethane reaction, if the reaction with a compound containing only groups capable of salt formation has previously been carried out.

The aqueous dispersions obtained by the process of this invention are stable and suitable for storage and transport or they can be subjected to subsequent formative processes at any subsequent time without the addition of an emulsifier, although suitable anionic, cationic or neutral emulsifiers and dispersing agents may be added if desired. Some such suitable materials are, for example, casein which has been hydrolysed with ammonia or an acid, fatty alcohol sulphonates, polyvinyl alcohol, hydroxyethylated phenols, a polyglycol ether of oleyl alcohol or natural products such as gelatine, gum arabic, tragacanth, fish glue, agar agar, salts of uric acids and quaternated fatty amines.

In some cases, coarsely dispersed suspensions and pastes are obtained in the practice of this invention and such products may be worked up into moulding compositions, coating compositions and surface fillers.

The dispersions obtained may be blended further with dispersions of like charge such as, for example, with dispersions of polyvinyl chloride, polyethylene, polystyrene, polybutadiene and copolymeric resins.

Any suitable fillers, plasticisers, pigments, hydrofluoric acid sols and silicic acid sols, aluminum, clay dispersions, asbestos dispersions and the like may be incorporated into the dispersion produced in the practice of this invention. The fillers, pigment, blending agents and other additives may be added in solution or suspension form to the products of the process of this invention while the product is in the form of a solution or dispersion in an organic solvent or in water, or they may be added to the products on mixing rollers.

The products of the process are further processed by simply removing the water and any residue of the organic solvent still present. The removal of solvent may also be carried out in the presence of fillers so that the product may be shaped at the same time.

The availability of polyurethane masses of many different compositions in an aqueous form provides many new possibilities for their application. Thus it is possible to obtain dip-moulded articles as well as foam plastic materials prepared by the latex foam beating process and, with the addition of an electrolyte to the aqueous dispersions, coagulates which can be worked up on mixing rollers as are polyurethane masses which are free from solvent. In addition, by the evaporation of any solvent present in the product of this invention, it is possible to obtain non-sticky and adhesive films, foils and crystalline powders. Further, the products of the process are suitable for coating and impregnating woven and nonwoven textiles, leather, paper, wood or metals and for making anti-static and crease-resistant dressings; they may be used as binders for fleeces, as adhesives, as backing agents, as plasticisers and binders such as, for example, for cork powder or sawdust, glass fibres, asbestos, paper type materials, plastic or rubber waste or ceramic materials. The products of the process of this invention are also useful as auxiliary agents in cloth printing and in the paper industry, as additives to polymer dispersions, as an expedient for imparting hydrophobic characteristics to a material, as sizing agents and for the dressing of leather and so on.

The invention is further illustrated but is not intended to be limited by the following examples in which all parts and percentages are by weight unless otherwise specified.

Preparation of the polyurethane masses in microgel form used as starting material.

METHOD A (PREPOLYMER PROCESS)

The given quantities of relatively high molecular weight polyhydroxy compounds are treated with the given diisocyanates at the given temperatures and stirred for about 10 minutes. The chain lengthening agent is then allowed to react in the same temperature region and the clear reaction melt is poured into moulds. If necessary, the product is subsequently heated at about 100° to about 110° C. and the cooled isocyanate polyaddition product is granulated and converted into a microgel in tetrahydrofuran.

METHOD B (ONE-SHOT PROCESS)

A mixture of relatively high molecular weight polyhydroxycompounds and chain lengthening agents heated to the given temperature is intimately mixed with the quantity of polyisocyanate provided. During this operation, the reaction temperature rises to the indicated value. If necessary, the product is subsequently heated as in Method A. The disintegrated material is converted into the form of a microgel by the aforesaid method.

A(1).—About 69.0 parts of a polyester of hexane-(1,6)-diol, 2,2-dimethyl propane-(1,3)-diol (molar ratio 22:12) and adipic acid (OH number 56: acid number 1), about 26.3 parts of diphenylmethane-4,4'-diisocyanate and about 4.7 parts of butane-(1,4)-diol are reacted by Method A at about 100° C. for about 30 minutes. The material is cooled under anhydrous conditions and is thereafter converted into a microgel in tetrahydrofuran by boiling under reflux. The NCO/OH ratio is about 1.19; the NCO excess is theoretically about 1.44%, and found about 0.63%.

A(2).—About 69.4 parts of a polyester as in A(1), about 26.3 parts of diphenylmethane-4,4'-diisocyanate and about 4.3 parts of butane-(1,4)-diol are reacted by Method B at about 100° C. for about 45 minutes. The NCO/OH ratio is about 1.28; the NCO excess is theoretically about 1.93%, and found about 0.56%. About 80 g. of the mass are dissolved in tetrahydrofuran to yield about a 20% microgel.

A(3).—About 75.8 parts of a polyester as in A(1), about 21.4 parts of a 65/35 ratio of 2,4/2,6 toluylene diisocyanate and about 1.4 parts of butane-(1,4)-diol are reacted by Method A at about 120° to about 130° C. for about 30 minutes. The NCO/OH ratio is about 1.71; the NCO excess is theoretically about 4.31%, and found about 3.4%. About 200 g. of the mass are dissolved in tetrahydrofuran to form about a 50% microgel.

A(4).—About 69.7 parts of a poly-(hydroxypropylene)-glycol having a molecular weight of about 2000, about 26.2 parts of diphenylmethane - 4,4' - diisocyanate and about 4.1 parts of 1,4-butanediol are reacted by Method A at about 100° to about 120° C. for about 30 minutes, the prepolymer reaction being extended for a further about 20 minutes. When poured into moulds, the polyurethane is heated after the chain lengthening reaction for about another 2 hours. The NCO/OH ratio is about 1.30; the NCO excess is theoretically about 2.02%, and found about 1.80%. About 40 g. of the polyurethane mass are dissolved in tetrahydrofuran to form about a 20% microgel.

A(5).—About 84.9 parts of polyester as in A(1), about 13.6 parts of hexamethylene-(1,6)-diisocyanate and about 1.5 parts of 1,4-butanediol are reacted and heated as in A(4). The NCO/OH ratio is about 1.30; the NCO excess is theoretically about 1.57%, and found about 1.40%. About a 20% microgel solution is prepared in tetrahydrofuran.

EXAMPLE 1

About 400 parts of the 10% tetrahydrofuran microgel of A(1) are concentrated by evaporation in a reaction flask equipped with high speed stirrer and treated at about 55° C. with about 1.8 parts of about a 20% aqueous taurine sodium solution.

After thoroughly stirring the reaction mixture, about 200 ml. of water are added. When the reaction mixture has become homogeneous, the organic solvent is distilled off. A stable polyurethane dispersion remains behind which has a pH of about 6 to 7 and which dries to form a firm, elastic film.

EXAMPLE 2

About 400 parts of the microgel A(2) are treated at about 60° C. with about 3.4 parts of about a 20% aqueous taurine sodium solution. When the reaction is completed, about 450 ml. of water are added and the solvent is removed by evaporation. The dispersion obtained is stable to about a 5% sodium chloride solution but is precipitated by hot 5% calcium chloride solution.

EXAMPLE 3

About 200 parts of microgel A(3) are reacted at about 55° C. with about 23.9 parts of about a 20% aqueous tourine sodium solution. When the reaction is completed, about 545 ml. of water are slowly added and the tetrahydrofuran is distilled off in vacuo at about 55° to about 60° C. About 660 parts of a dispersion having a solids content of about 15% and a pH of about 7 to 8 are obtained. The dispersion dries at room temperature to form an elastic and firm foil. The water resistance of the foil is improved by subsequently heating it for a short time at about 120° C. The dispersion is stable against aqueous concentrated ammonia solution.

EXAMPLE 4

About 100 parts of the solid polyurethane mass A(3) are dissolved in about 250 ml. of tetrahydrofuran and reacted at about 65° C. with about 5.6 parts of 1,3-aminodimethylamino-propane. After about a half hour, about 5.6 parts of dimethylsulphate are added at about 50° C. The reaction is completed after another about 30 minutes. After the addition of about 500 ml. of water, the tetrahydrofuran is distilled off. The dispersion obtained, which has a pH of about 8, has a concentration of about 18% and is free from tetrahydrofuran; it is coagulated by alkalies, ammonia and electrolyte solutions but is substantially stable against glacial acetic acid and forms a sightly sticky, transparent foil when dry.

EXAMPLE 5

About 200 parts of microgel A(4) are reacted at about 60° C. with an aqueous solution of about 1.81 parts of glycocollic potassium in about 25 ml. of water. After the addition of about 200 ml. of water, the organic solvent is distilled off in vacuo and about 232 parts of a stable dispersion which dries to form a film of high tensile strength are obtained.

EXAMPLE 6

About 177 parts of the 20% microgel in tetrahydrofuran of A(4) are reacted at about 55° C. with about 5.48 parts of about a 20% aqueous methyl taurine sodium solution. After completion of the reaction, about 170 ml. of water are added and the tetrahydrofuran is distilled off and about 190 parts of a stable polyurethane dispersion are obtained. After removal of the water by evaporation, flexible, soft, elastic films are left behind.

EXAMPLE 7

About 200 parts of the 20% microgel in tetrahydrofuran of A(5) are reacted at about 55° to about 60° C. with about 1.81 parts of glycocollic potassium in about 25 ml. of water. After the addition of about 200 ml. water, the tetrahydrofuran is distilled off. The dispersion obtained is very finely divided and stable without the addition of an emulsifier and dries to form elastic foils.

It is to be understood that any of the components mentioned as suitable herein can be substituted for its counterpart in the foregoing examples and that although the invention has been described in considerable detail in the foregoing, such detail is solely for the purpose of illustration. Variations can be made in the invention by those skilled in the art without departing from the spirit and scope of the invention except as is set forth in the claims.

What is claimed is:

1. A method for preparing dispersions of cross-linked polyurethanes which comprises dispersing in water a salt-type polyurethane containing at least about 0.5% by weight of the polyurethane mass of salt-type groups and prepared by reacting in an organic solvent a microgel of a polyurethane having free isocyanate groups with a compound having only one hydrogen atom reactive with isocyanate groups and containing at least one salt-type group or group capable of salt formation selected from the group consisting of:

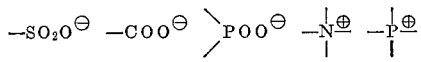

and

which is subsequently converted into the salt form before the polyurethane is dispersed in water, the microgel being a cross-linked NCO prepolymer prepared by reacting an excess of an isocyanate with a compound containing at least two hydrogen atoms reactive with NCO groups and refluxing the reaction product in a solvent to yield an opalescent solution of the cross-linked prepolymer, said solution remaining liquid up to a concentration of about 30%.

2. The method of claim 1 wheren ithe microgel is reacted at from about 0° C. to about 120° C. with the compound having one hydrogen atom reactive with isocyanate groups and containing at least one salt-type group or a group capable of salt formation.

3. The method of claim 1 wherein the microgel is dissolved in a solvent at from about 20° C. to about 150° C. and then reacted at from about 0° C. to about 120° C. with a compound containing a group reactive with isocyanate groups and at least one salt-type group or group capable of salt formation.

4. The method of claim 1 wherein the microgel is prepared by reacting a compound having groups reactive with isocyanate groups with a sufficient excess of isocyanate to exceed from about 0.1 to about 5% by weight of free isocyanate groups in the reaction product, and heating the reaction product until at least from about 0.1 to about 5% by weight of free isocyanate groups remain.

5. The method of claim 1 wherein the salt-type compounds are selected from the group consisting of taurine sodium, 1,3-aminodimethylaminopropane, glycocollic potassium and methyl taurine sodium.

6. The method of claim 1 wherein the salt-type group or group capable of salt formation contains halogen atoms capable of quaternating reactions or ester groups derived from strong acids.

References Cited

UNITED STATES PATENTS 3,264,134   8/1966   Vill et al. _____ 260—29.2
3,388,087   6/1968   Dieterich et al. _____ 260—29.2

MURRAY TILLMAN, Primary Examiner

J. C. BLEUTGE, Assistant Examiner

U.S. Cl. X.R.

117—132, 139.4, 142, 148, 155, 161; 156—331; 260—2.5, 6, 9, 29.6, 29.7, 37, 40, 75, 77.5, 859